United States Patent [19]

Suzuki et al.

[11] Patent Number: 4,910,619
[45] Date of Patent: Mar. 20, 1990

[54] AUTOMATIC CHANGING SYSTEM FOR CASSETTE-TYPE MEDIUMS

[75] Inventors: Yoshiaki Suzuki; Yutaka Isobe, both of Kanagawa, Japan

[73] Assignee: Sony Corporation, Tokyo, Japan

[21] Appl. No.: 242,130

[22] Filed: Sep. 9, 1988

[30] Foreign Application Priority Data

Sep. 16, 1987 [JP] Japan .................. 62-231759
Oct. 1, 1987 [JP] Japan .................. 62-248568

[51] Int. Cl.$^4$ ............................. G11B 15/68
[52] U.S. Cl. ........................... 360/92; 364/34
[58] Field of Search ........... 360/92, 91, 71; 369/34, 369/36, 38, 39

[56] References Cited

U.S. PATENT DOCUMENTS

| | | | |
|---|---|---|---|
| 4,614,474 | 9/1986 | Sudo | 369/36 |
| 4,731,682 | 3/1988 | Nishiyama et al. | 360/92 |
| 4,772,968 | 9/1988 | Nonaka et al. | 360/92 |
| 4,802,035 | 1/1989 | Ohtsuka | 360/92 |

FOREIGN PATENT DOCUMENTS 0239372 10/1987 Japan .

Primary Examiner—Stuart N. Hecker
Assistant Examiner—David Severin
Attorney, Agent, or Firm—Alvin Sinderbrand

[57] ABSTRACT

An automatic changing system for a cassette-type medium, having at least one recording and/or reproducing apparatus, a cassette storage apparatus includes multiple cassette storage compartments, and a cassette transporting apparatus by which a selected cassette may be either picked up from a compartment in the cassette storage apparatus and transported to the recording and/or reproducing apparatus, or picked up from the recording and/or reproducing apparatus and transported to the cassette storage apparatus. A cassette carriage is provided which includes three openings through which a cassette may be transported in a selected direction, without the need for a special device by which the cassette may be rotated 90° between the recording and/or reproducing apparatus and the cassette transporting apparatus.

6 Claims, 22 Drawing Sheets

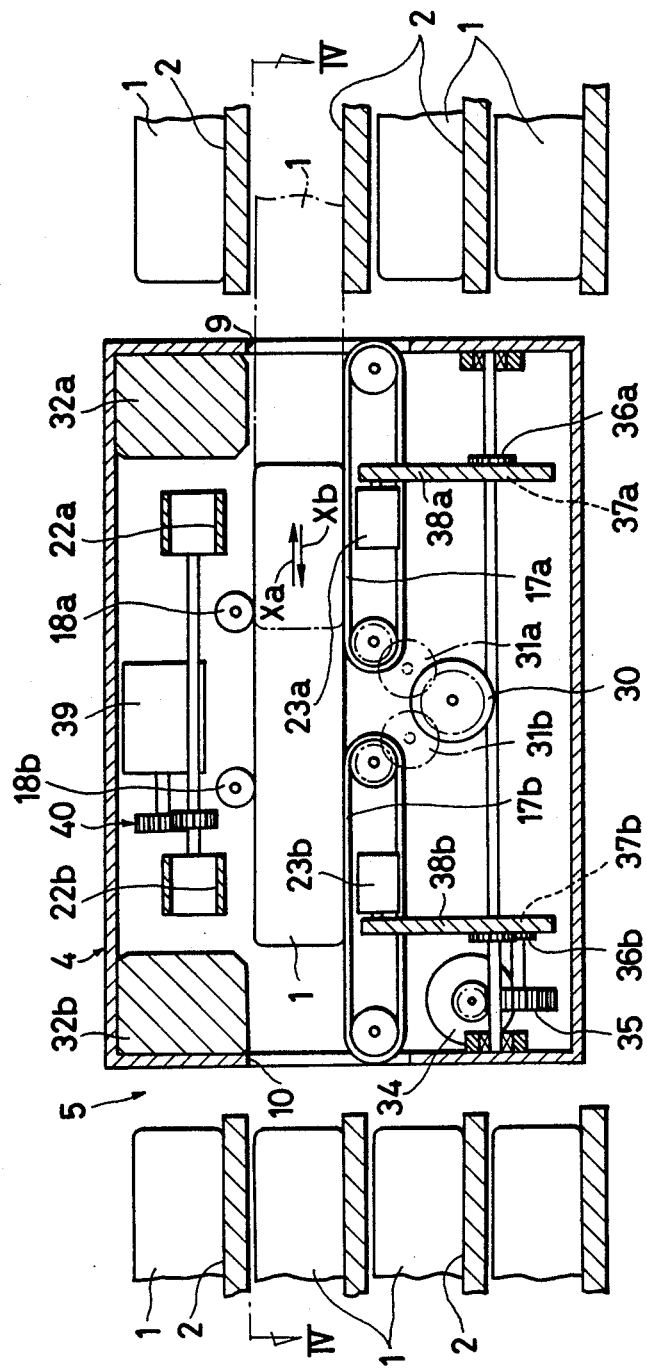

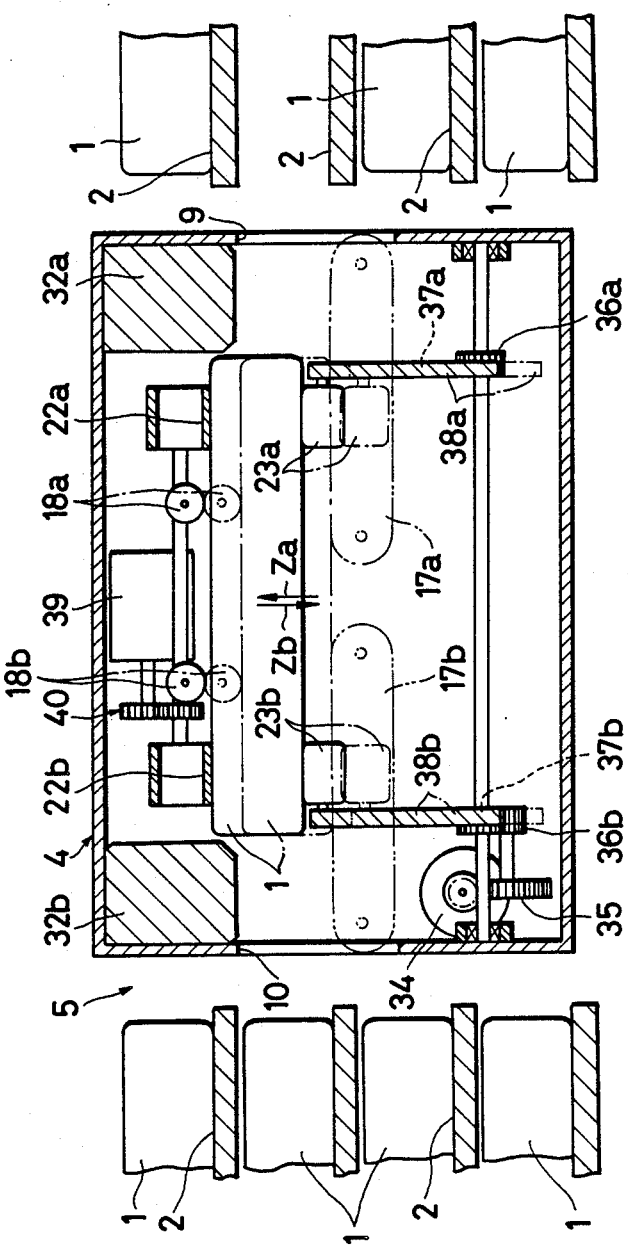

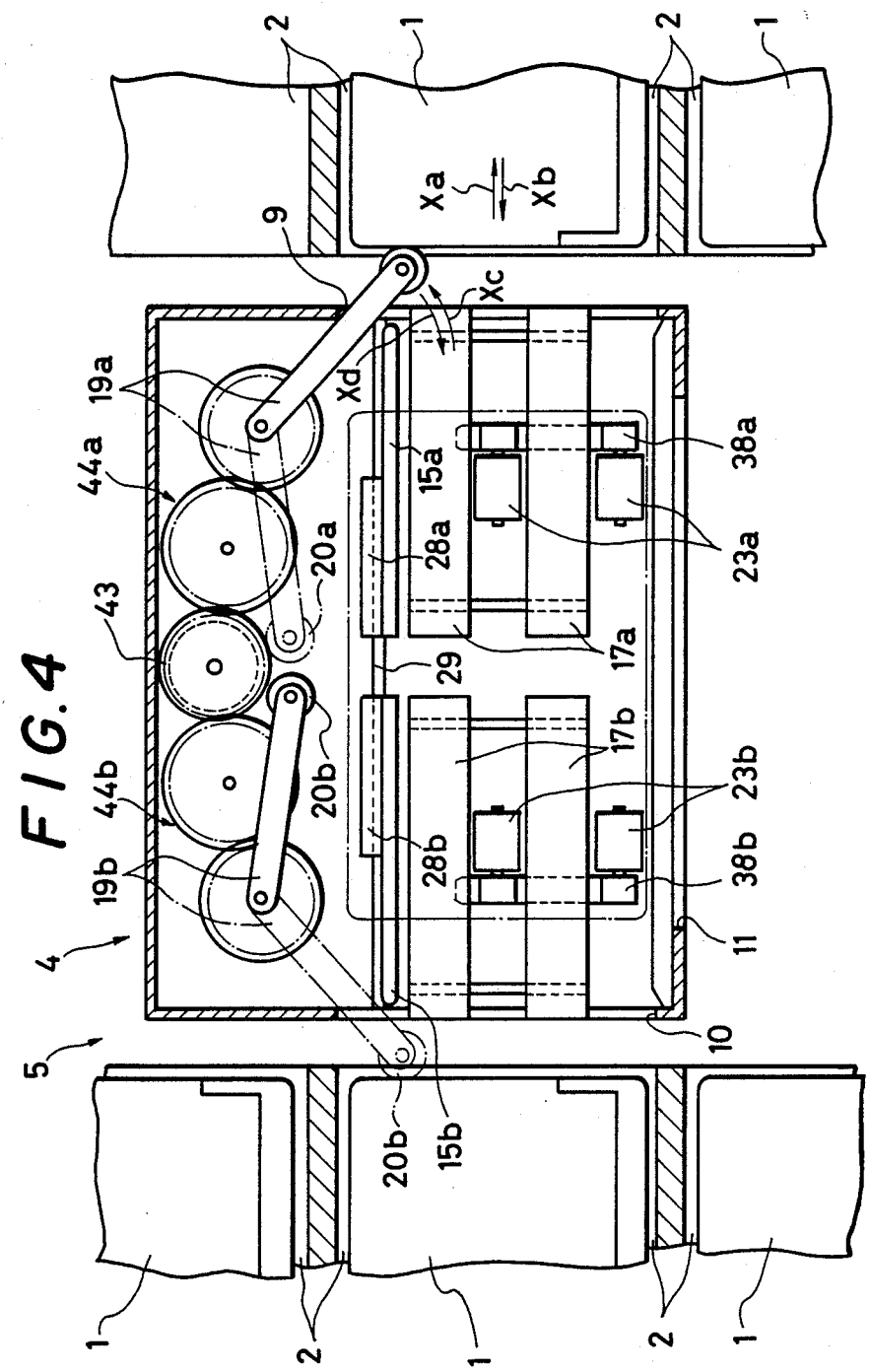

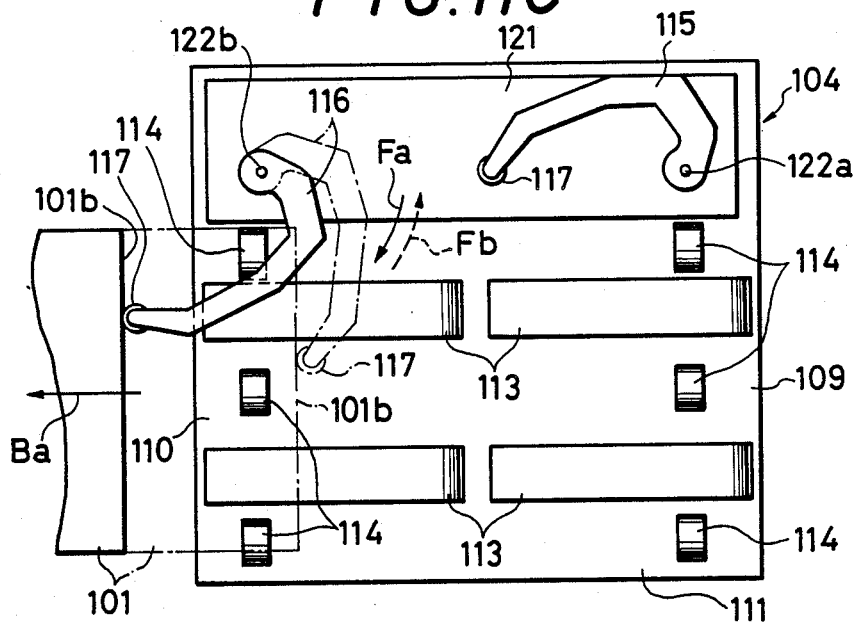
FIG. IIC
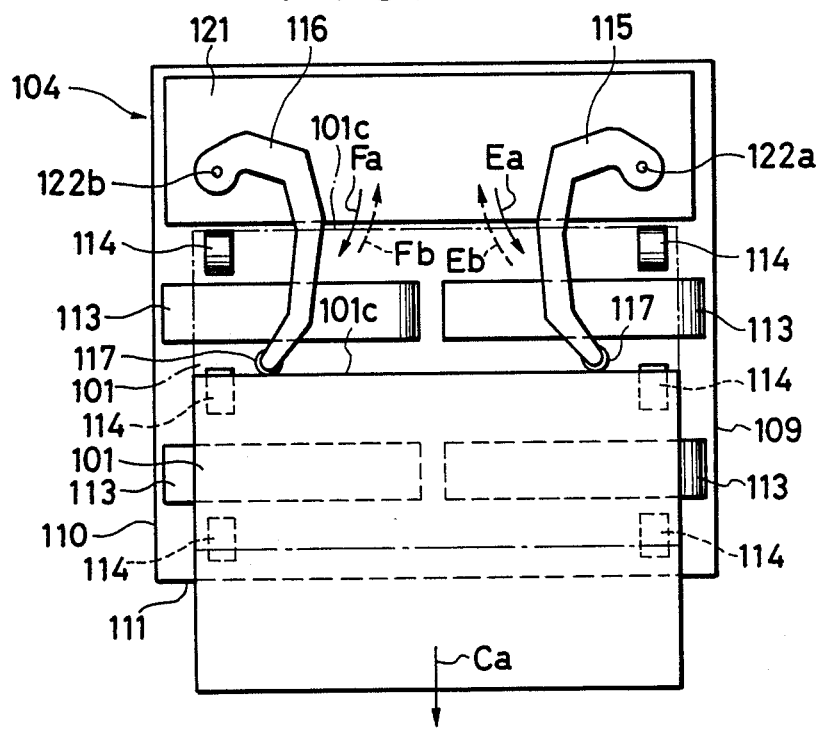
FIG. IID

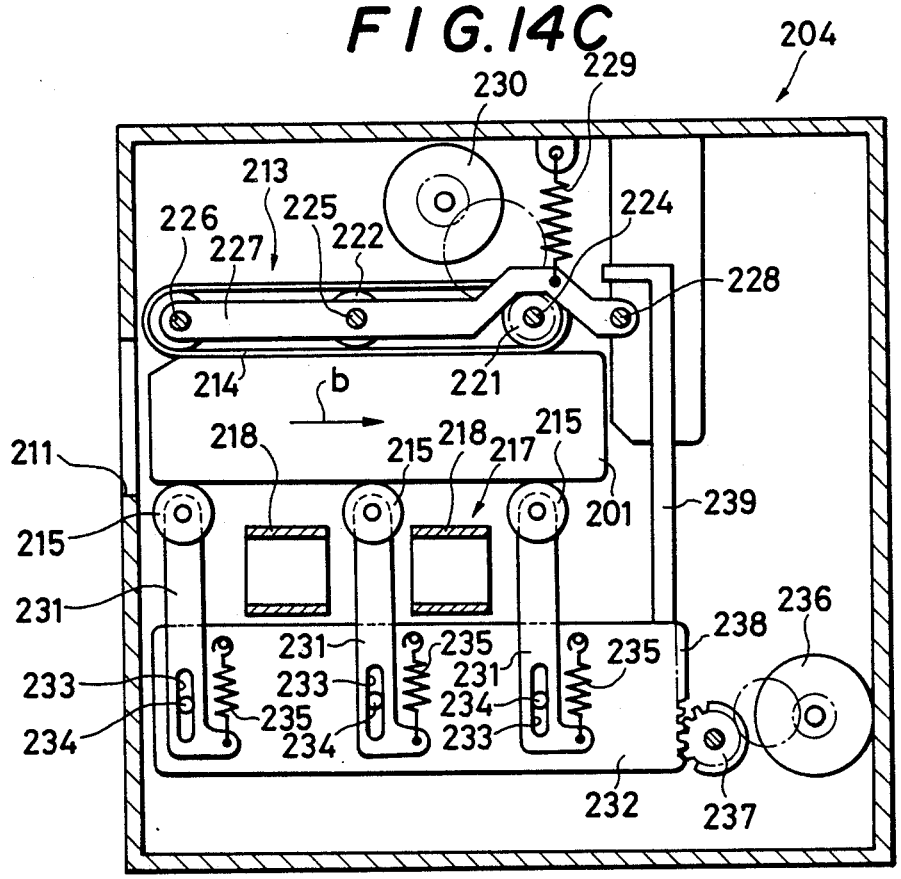

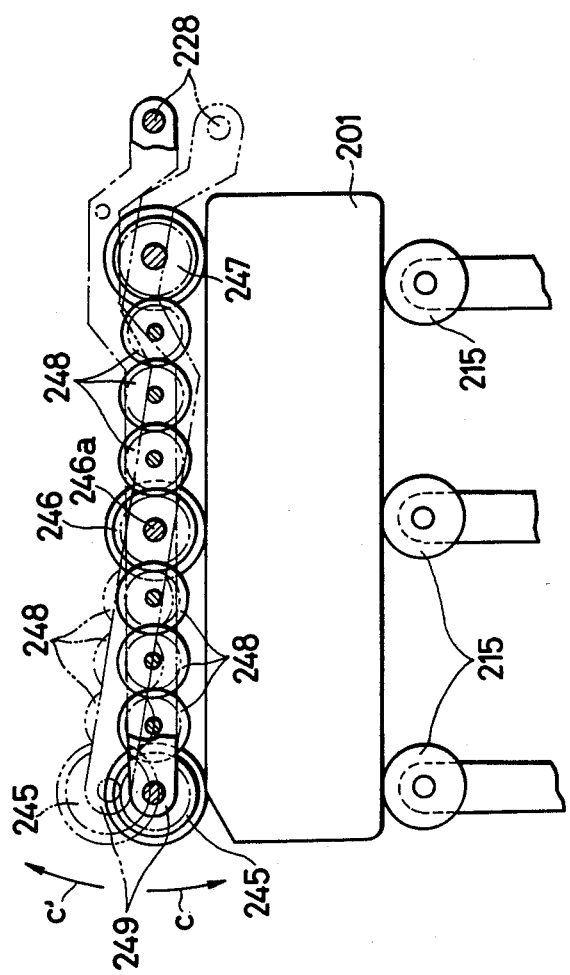

AUTOMATIC CHANGING SYSTEM FOR CASSETTE-TYPE MEDIUMS

BACKGROUND OF THE INVENTION

1. Field of the Invention

This invention relates to an automatic changing system for a cassette-type medium, and more particularly to a cassette carriage for use in an automatic changer for video tape cassettes, in which the changer utilizes a plurality of video cassettes and a plurality of video cassette recorders (VCRs). This type of automatic changer is especially useful for extended duration video recording and/or replay, such as is used in the television broadcasting field.

2. Description of the Prior Art

The prior art of this field is described, by way of example, in U.S. Pat. No. 4,731,682 (issued Mar. 15, 1988), which is assigned to the same assignee of this application. This patent shows that a cassette carriage may be provided between a VCR and cassette bins in order to transfer a video cassette from one of the bins to the VCR or vice versa.

However, this type of cassette changer requires a specially manufactured VCR which has openings for cassette insertion in its side panels, while maintaining the placement of the operation switches on the front panels. Because of the limited use for these specially made side loading machines, they cost much more than standard machines. Therefore, an automatic changing system is desired which may use general purpose VCRs having loading slots located on the same panel as the operation switches.

An additional problem also noted with this prior art is that, since only a single block of cassette bins is provided, the total storage capacity of the system is limited.

The assignee herein is also the applicant for a Japanese application, No. 61-80885, filed on Apr. 8, 1986, which has been published (on Oct. 20, 1987) as laid open patent 62-239372. In this Japanese patent application, side loading VCRs are also used with an automatic changer. To increase the storage capacity in this system, two blocks of cassette bins are provided, between which a cassette carriage, used for transferring cassettes, is movable. However, this prior art device includes a cassette rotating system for rotating a cassette 90°, in order to change the cassette orientation with respect to the side loading slot used in ordinary purpose VCRs. This cassette rotating system is very complex and is costly to manufacture and maintain.

SUMMARY OF THE INVENTION

It is, therefore, an object of the present invention to provide an automatic changing system for a cassette-type medium which overcomes the above described problems.

It is another object of the present invention to provide an automatic changing system for a cassette-type medium, having a large capacity for storing a plurality of cassettes, and which does not require a mechanism for rotating a cassette in order to load the cassette into a VCR.

A further object of the present invention is to provide an automatic changing system for video tape cassettes which may use ordinary or general purpose VCRs.

Therefore, in accordance with one aspect of this invention, there is provided a cassette automatic changing machine having at least one recording and/or reproducing apparatus, a cassette storage apparatus comprising multiple cassette storage compartments, and a cassette transporting apparatus by which a selected cassette may be picked up from a compartment in the cassette storage apparatus and transported to the recording and/or reproducing apparatus.

A cassette may also be retrieved from the recording and/or reproducing apparatus and then transported to a selected cassette compartment in the cassette storage apparatus. The cassette transporting apparatus includes first and second openings through which cassettes may be transported in first and second parallel directions between the cassette storage apparatus and the cassette transporting apparatus, and a third opening through which cassettes may be transported in a third direction perpendicular to the first and second directions between the cassette transporting apparatus and the recording and/or reproducing apparatus. The cassette storage apparatus may be installed on both sides of the cassette transporting apparatus to form a channel along which the latter is movable. The selected cassette may then be transported between said recording and/or reproducing apparatus and said cassette transporting apparatus in the third direction which is perpendicular to the first and second directions. In this way, the recording and reproducing apparatus may be easily maintained. In addition, only a simple mechanism is needed to pick up or insert a cassette from or to the cassette storage apparatus during the operation of the cassette transporting apparatus. Thus, there is no need for a special device by which the cassette may be rotated 90° between said recording and/or reproducing apparatus and said cassette transporting apparatus.

BRIEF DESCRIPTION OF THE DRAWINGS

A better understanding will be had by referring to the accompanying drawings, in which:

FIGS. 2A, 2B and 2C illustrate side views of the inside configuration of one embodiment of the cassette transporting device and cassette storing device of the present invention;

FIG. 4 is a schematic illustration of the operation of the embodiment shown in FIG. 1;

FIGS. 11A, 11B, 11C and 11D are schematic illustrations explaining the operation of the embodiment shown in FIG. 9;

FIGS. 14A, 14B, 14C and 14D are side views of the cassette transporting device illustrating the operation of the embodiment shown in FIG. 13;

FIG. 16 is an enlarged side view of the embodiment shown in FIG. 13 illustrating in further detail the operation of the embodiment shown in FIG. 13.

DETAILED DESCRIPTION OF THE PREFERRED EMBODIMENTS

Figure 5:
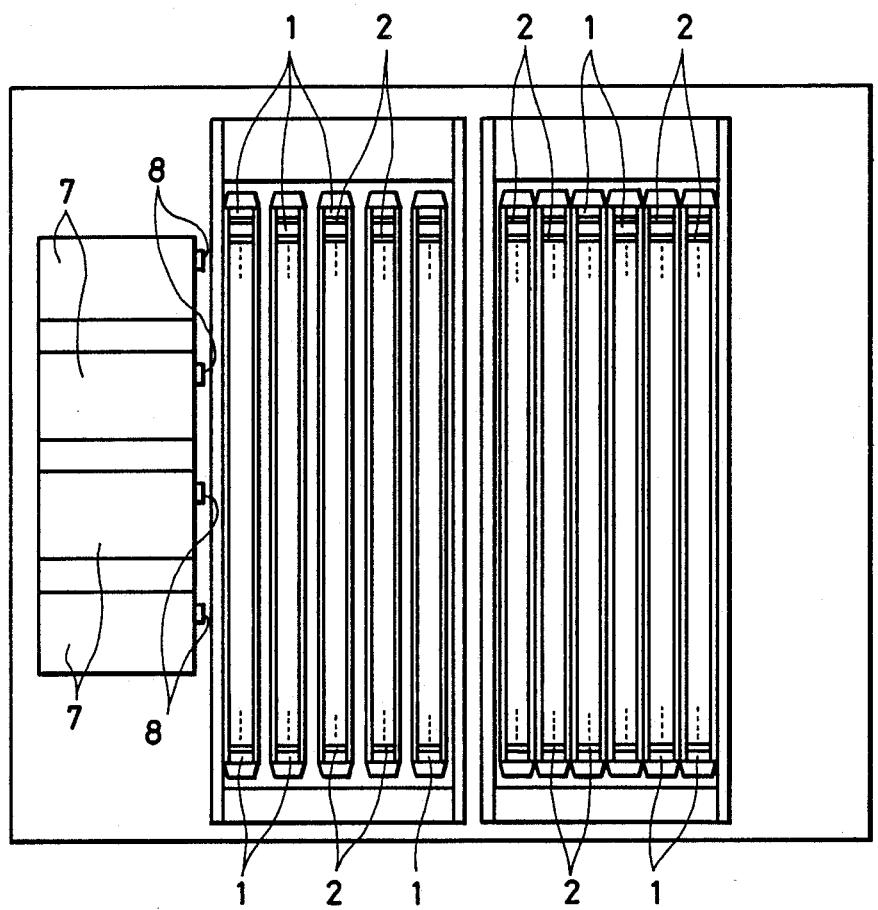
FIG. 5 illustrates the automatic cassette changer system of the present invention.
Figure 6:
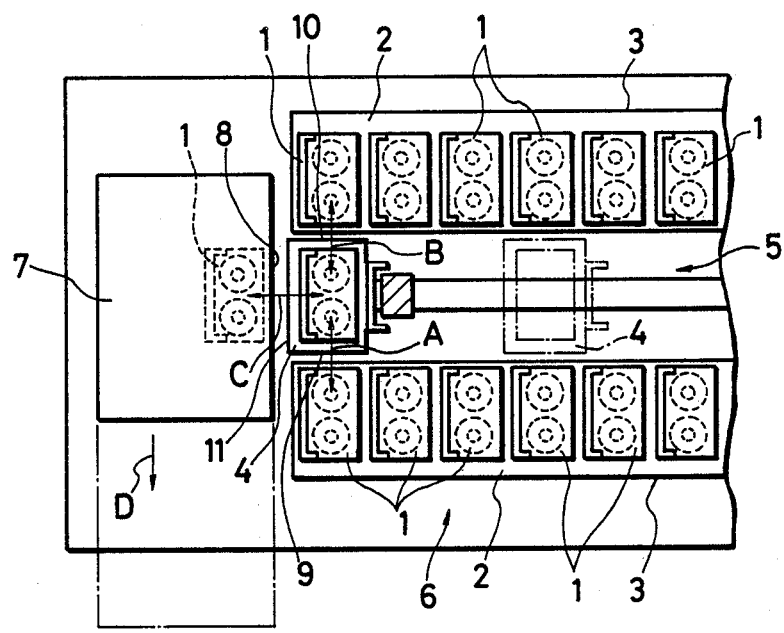
FIG. 6 is a top plan view of the system shown in FIG. 5.

As shown on FIGS. 5 and 6, a type of automatic changer embodying this invention is capable of storing several hundred cassettes 1 which are stored in cassette bins 2 arranged in blocks 3 inside the automatic changer. Each of the cassette bin blocks 3 has approximately 30-50×5-10 bins arranged in vertical and horizontal directions as shown in FIG. 6. The bin blocks 3 are arranged on opposite sides of the automatic changer so that a cassette carriage 4 may move in a channel 5 between the blocks 3. For convenience in maintenance and service, two bin blocks 3 on the operator's side 6 may be equipped with openable double-sided doors while two bin blocks on the other side are fixed.

In addition to the bin blocks 3, a plurality of recording and/or reproducing apparatuses 7, such as ordinary front-loading video cassette recorders, are arranged with their cassette inserting portions 8 communicating with the moving channel 5 in which cassette carriage 4 rides. Many cassettes can be stored in the bins 2 as shown in FIG. 6.

The cassette carriage 4 has first and second openings 9 and 10 (FIGS. 1 and 2A) for receiving and replacing the cassettes 1 from and to the cassette bins 2 in a first direction A and a second direction B (FIG. 6). Additionally, a third opening 11 (FIGS. 1 and 3A) is supplied for receiving and positioning the cassette from and to the video cassette recorder 7 in a third direction C (FIG. 6), which direction is perpendicular to the first and second directions (A and B).

In operation, the automatic changer selectively withdraws a cassette, without realigning the cassette's orientation, from any desired cassette bin 2 through the first or second opening 9 or 10 of the cassette carriage 4, which, as noted, may move freely in both the vertical and horizontal directions within moving channel 5. The cassette carriage, after loading the desired cassette, locates to the desired video cassette recorder 7 and inserts the cassette 1 into the cassette loading mechanism of the desired video cassette recorder, in a direction C, using the third opening 11. This is also done without changing the cassette's orientation.

After this inserting operation of the cassette 1 by the cassette carriage 4, the cassette 1 is automatically loaded into the inside of the VCR 7 by the loading mechanism of the VCR. By using a plurality of VCRs in a serial manner or possibly simultaneously, it is possible to have continuous video recording and/or reproducing for a long period of time. After use, each cassette is returned to its original cassette bin utilizing a reverse operation.

When maintenance is needed, an idle VCR 7 can be withdrawn via the operator's side 6, in the direction D (FIG. 6), even if the cassette carriage 4 is in operation. Inserting or withdrawing cassettes without damage thereto into or from the cassette bins 2 is also possible during the operation of the cassette carriage 4.

In addition, the number of cassettes stored within a specified length in the direction C (as shown in FIG. 6) can be quite large. This is due to the fact that the cassettes are stored such that their longest dimensions are aligned with the directions B or A.

Figure 1:
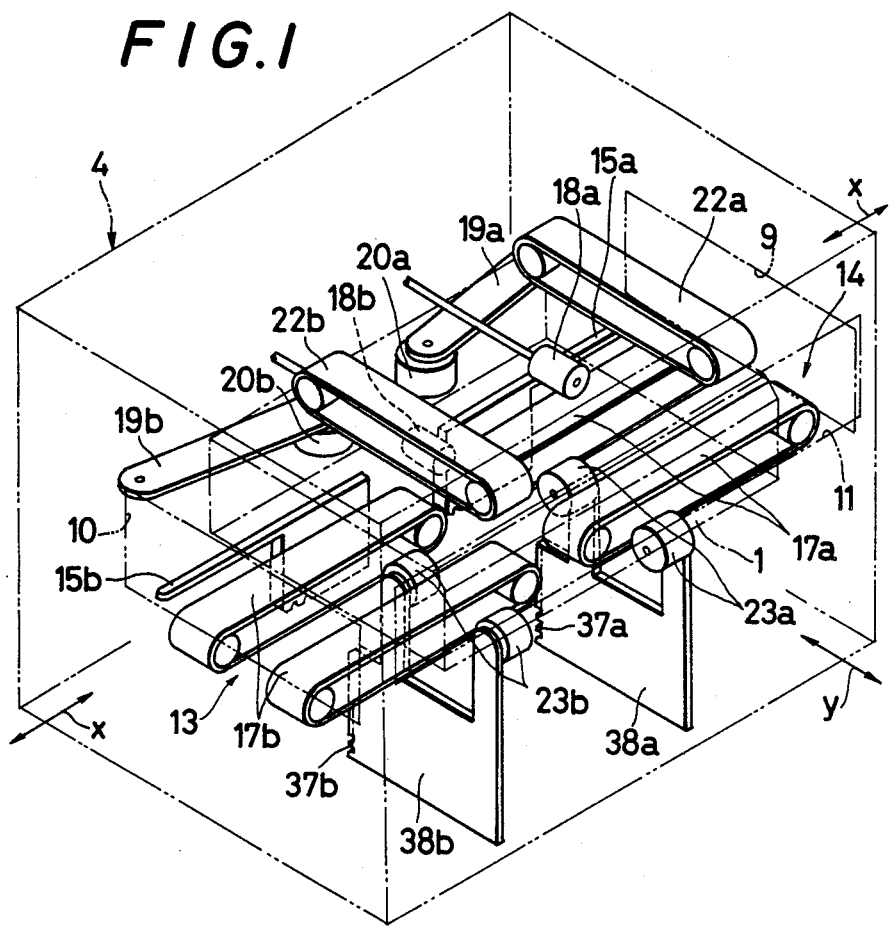
FIG. 1 is a schematic perspective view showing the cassette transporting device of the present invention.

FIGS. 1 to 4 illustrate a first embodiment of the cassette carriage 4 according to the present invention. As shown in FIG. 1, the cassette carriage 4 generally comprises a first cassette transferring mechanism 13 for receiving and releasing a cassette 1 in the direction X through the first and second openings 9 and 10; a second cassette transferring mechanism 14 for receiving and releasing cassette 1 in the direction Y through third opening 11; and a pair of levers 15a and 15b passing through first and second openings 9 and 10, respectively, in the direction X and functioning to cause the cassette bins to release cassettes 1 contained therein. First cassette transferring mechanism 13 includes first and second pairs of cassette conveyor belts 17a and 17b, each of which is oriented parallel to direction X; a pair of first cassette pushing rollers 18a and 18b, each of which is oriented perpendicular to direction X; a pair of cassette pushing arms 19a and 19b; and a pair of second cassette pushing rollers 20a and 20b which are located at the ends of pushing arms 19a and 19b, respectively. Second cassette transferring mechanism 14 includes a third pair of cassette conveyor belts 22a and 22b oriented parallel to the direction Y, and two pairs of third cassette pushing rollers 23a and 23b, oriented perpendicular to direction Y.

Figure 2A:
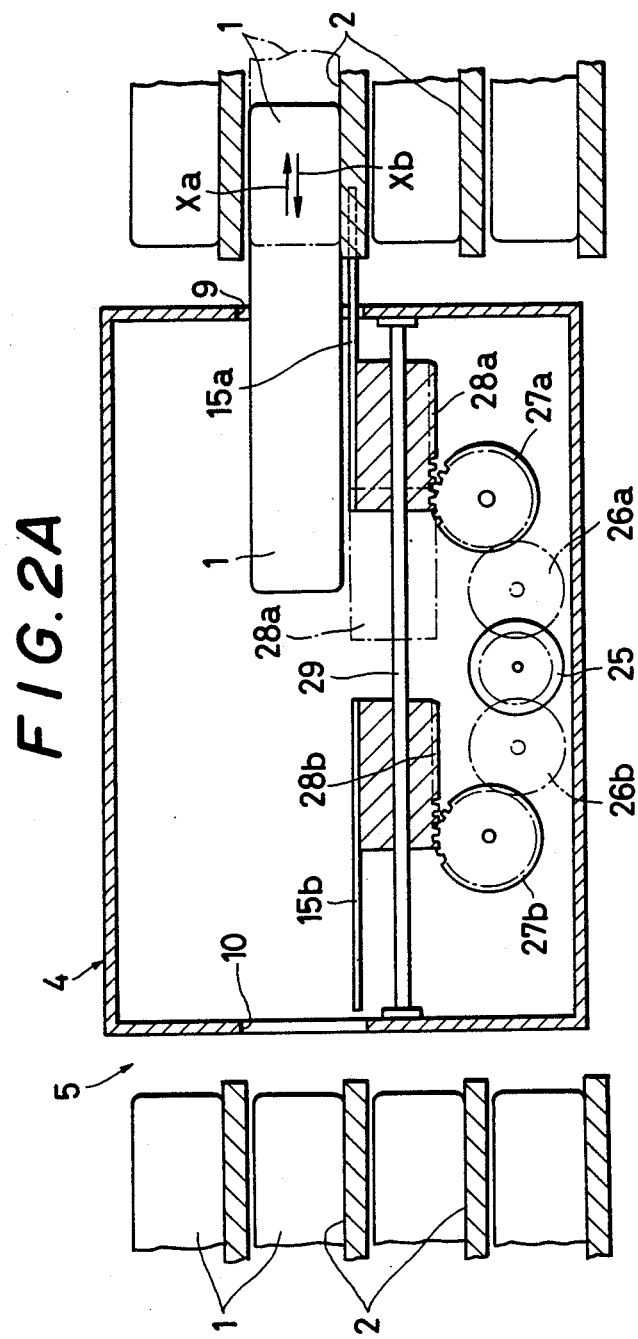

The following describes the mechanics and functions of cassette carriage 4 when picking up a cassette 1 from cassette bin 2 on the operator's side and receiving same into the cassette carriage through the first opening 9. As shown in FIG. 2A, a first pinion 27a of a pair of first and second pinions 27a and 27b is driven by a motor 25 through a clutch (not shown) and a first gear train 26a of a pair of first and second gear trains 26a and 26b. First pinion 27a drives a first rack 28a of a pair of first and second racks 28a and 28b so that lever 15a protrudes from first opening 9 into cassette bin 2 in the direction xa. The cassette releasing system (not shown) of cassette bin 2 is contacted and activated by the end of lever 15a so that cassette 1 is released from cassette bin 2. Cassette 1 is then inserted into cassette carriage 4 from its storage position shown by the phantom lines of FIG. 2A to the position shown by the solid lines.

As shown by the phantom lines depicting cassette 1 in FIG. 2B, cassette 1 is inserted between the first pair of cassette conveyor belts 17a and one of the first cassette pushing rollers 18a in opposition to the pushing force exerted by first cassette pushing roller 18a. Upon detection by a sensor (not shown) of the insertion of cassette 1 into cassette carriage 4, a motor 30 starts to rotate and drive a pair of gear trains 31a and 31b, which in turn drive the first and second pairs of cassette conveyor belts 17a and 17b in the direction xb. Cassette 1 is thereby withdrawn from cassette bin 2 into the cassette carriage 4 by the action of first and second pairs of conveyor belts 17a and 17b in response to the pressure by first cassette pushing rollers 18a and 18b on cassette 1. When a second sensor (not shown) detects that cassette 1 has reached a predetermined position between a pair of guides 32a and 32b (as indicated by the solid lines depicting cassette 1 in FIG. 2B), the motor 30 stops. Upon completion of the operation of the release of cassette 1 from cassette bin 2 and insertion of same into cassette carriage 4, motor 25 will additionally have caused lever 15a to retract into cassette carriage 4 (as indicated by the phantom lines in FIG. 2A).

After completion of the above-described operation, cassette 1 is securely held between first cassette pushing rollers 18a and 18b, and first and second pairs of cassette conveyor belts 17a and 17b. Thereafter, cassette carriage 4 containing cassette 1 moves to the cassette inserting portion 8 of the VCR 7. It is noted that the same operations as described above are used when withdrawing a cassette 1 from cassette bin 2 on the side opposite to the operator's side 6 of cassette carriage 4, thus the need for a detailed description in this regard is obviated.

Figure 3A:
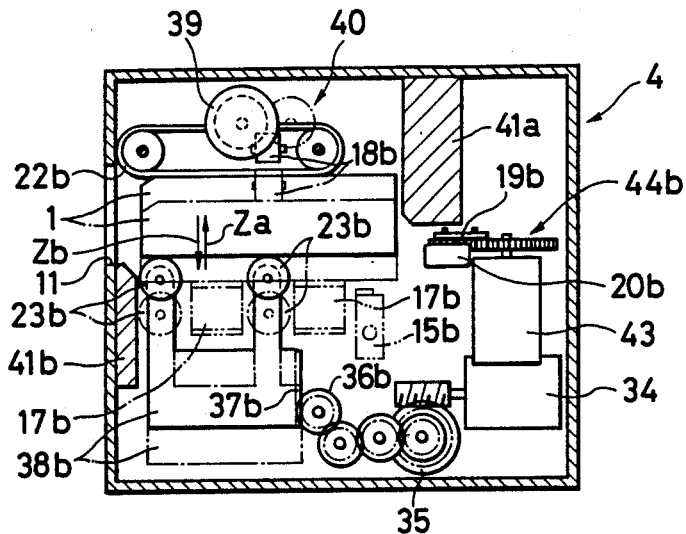
FIGS. 3A and 3B are schematic illustrations explaining the operation of the embodiment shown in FIG. 1.

Next, the mechanics and operation of transferring a cassette from within the cassette carriage 4 to the cassette inserting portion 8 of the VCR 7 through the third opening 11 of the cassette carriage 4 will be described. As shown in FIGS. 2C and 3A, in response to an appropriate instruction signal, motor 34 drives a pair of pinions 36a and 36b through a gear train 35 and torque limiter (not shown). A pair of vertically movable frames 38a and 38b, which are integral with a pair of racks 37a and 37b, are driven by pinions 36a and 36b in the direction Za. Accordingly, the two pairs of third cassette pushing rollers 23a and 23b which are connected to the vertically movable frames 38a and 38b, respectively, move upward in the direction Za. In addition, while guided by the pair of guides 32a and 32b, cassette 1 is pushed upward from the first and second pairs of cassette conveyor belts 17a and 17b, shown in phantom lines, into contact with the third pair of cassette conveyor belts 22a and 22b, as illustrated in the drawings by solid lines. In this manner, cassette 1 will eventually be positioned facing the third opening 11 of cassette carriage 4.

Figure 3B:
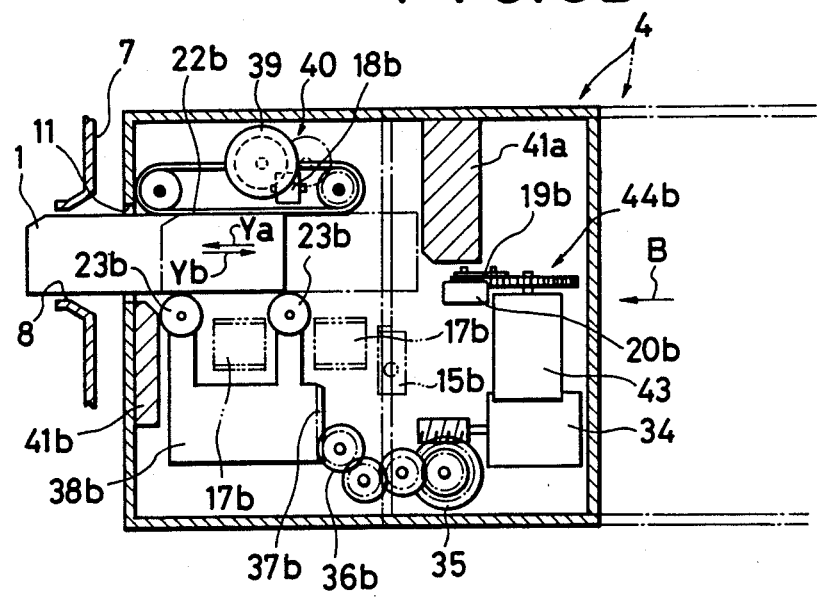

When a sensor (not shown) detects the completion of the above-described operations, motor 34 stops, and a motor 39 starts to operate. As shown in FIG. 3B, the third pair of cassette conveyor belts 22a and 22b is driven by motor 39 through a gear train 40 in the direction Ya. Accordingly, cassette 1, which is supported by the pairs of third cassette pushing rollers 23a and 23b and guided by the pair of guides 32a and 32b, is conveyed by the belts 22a and 22b in the direction Ya. This is illustrated in FIG. 3B of the drawings by the positions of the phantom and solid lines, respectively, of cassette 1. As a result, cassette 1 is ejected from the inside of cassette carriage 4 into the cassette inserting portion 8 of the VCR 7 through the third opening 11. Once cassette 1 is inserted into the cassette inserting portion 8 of the VCR 7, a well-known VCR cassette loading mechanism (not shown) loads cassette 1 into VCR 7.

During the above-described operation, the first cassette pushing rollers 18a and 18b, as well as the two pairs of third cassette pushing rollers 23a and 23b, move upward in the direction Za in conjunction with the movement of vertically movable frames 38a and 38b. Consequently, when cassette 1 reaches the third pair of cassette conveyor belts 22a and 22b, first cassette pushing rollers 18a and 18b no longer contact the upper surface of cassette 1 and, therefore, do not interfere with the movement of cassette 1 in the direction Za. When a sensor (not shown) detects that cassette 1 is ejected from third opening 11 of the cassette carriage 4, the motor 39 will stop.

The following describes the reverse operation of the cassette carriage 4 embodying the present invention, viz., that the cassette 1 is transferred from the cassette inserting portion 8 of the VCR 7 to the cassette carriage 4 through the third opening 11. As shown in FIG. 3B, cassette 1 is ejected by a cassette unloading mechanism (not shown) of the VCR through the cassette inserting portion 8 in the direction Yb. The position of the cassette 1 at this point is illustrated by a solid line in FIG. 3B. It is possible that the cassette carriage 4 has maintained its position after performing the above operation of ejecting cassette 1 into the VCR in the direction Ya. In this case, the cassette 1 which is now ejected from the VCR 7 in the direction Yb is merely inserted against the pushing force exhibited by the two pairs of third cassette pushing rollers 23a and 23b, into the third opening 11 and is positioned in between the third pair of cassette conveyor belts 22a and 22b and the two pairs of third cassette pushing rollers 23a and 23b.

It is also possible that the cassette carriage 4 has moved after ejecting a cassette into the VCR. In this case, after cassette 1 is ejected from VCR 7, carriage 4 moves toward VCR 7 in the direction B as shown by the positions of the phantom lines and solid lines in FIG. 3B. As further illustrated by FIG. 3B, when a sensor (not shown) detects the insertion of cassette 1 in direction Yb into the third opening 11 of cassette carriage 4, the motor 39 begins to rotate in a reverse direction. Accordingly, the third pair of cassette conveyor belts 22a and 22b draw cassette 1 into the inside of the cassette carriage 4 in the direction Yb. Once cassette 1 is thereby positioned between a pair of guides 41a and 41b (as indicated by the phantom lines of cassette 1 in FIG. 3B), motor 39 stops. Next, motor 34 begins to rotate in a reverse direction, causing pairs of third cassette pushing rollers 23a and 23b and cassette 1 to move downward in the direction Zb. (Refer to phantom lines of FIGS. 2C and 3A.) After cassette 1 has moved downward a sufficient distance so that it no longer contacts third pair of cassette conveyor belts 22a and 22b, cassette 1 is pushed by first cassette pushing rollers 18a and 18b toward first and second cassette conveyor belts 17a and 17b. Cassette 1 is thereby positioned via guides 41a and 41b onto first and second cassette conveyor belts 17a and 17b. When a sensor (not shown) detects that cassette 1 has reached first and second cassette conveyor belts 17a and 17b, motor 34 stops.

The following is a description of the mechanics and operations involved in transferring a cassette 1 from the inside of the cassette carriage 4 to cassette bin 2 through the first opening 9. As shown in FIGS. 2A and 2B, in response to an instruction signal, motor 30 begins to rotate in a reverse direction. Accordingly, first and second cassette conveyor belts 17a and 17b are driven in the direction Xa by motor 30 through gear trains 31a and 31b. As a result, cassette 1 is moved in the direction Xa by the belts 17a and 17b and is inserted into the cassette bin 2 through the first opening 9.

As shown in FIG. 4, the arm 19a of the pair of cassette pushing arms 19a and 19b is driven by a motor 43 through a clutch (not shown), a torque limiter (not shown), and one gear train 44a of a pair of gear trains 44a and 44b. Cassette 1 is pushed in the direction Xa by the second cassette pushing roller 20a which is located at the end of cassette pushing arm 19a. After cassette 1 has been fully inserted by second cassette pushing roller 20a into cassette bin 2 in the position shown in solid lines in FIG. 4, this position of cassette 1 is detected by a sensor (not shown) and motor 30 stops. Next, motor 43 begins to rotate in a reverse direction, causing cassette pushing arm 19a and second cassette pushing roller 20a to move in the direction Xd, returning the same from the position shown by the solid line to the position shown by the phantom line. Finally, motor 43 stops.

As is clear from the above description, the operation of transferring a cassette 1 from inside cassette carriage 4 to a cassette bin 2 located on the side opposite to the operator's side is the same (except that cassette pushing arm 19b and the second cassette pushing roller 20b are utilized). Hence, a more detailed description of this operation is not necessary and is, therefore, omitted.

Figure 7:
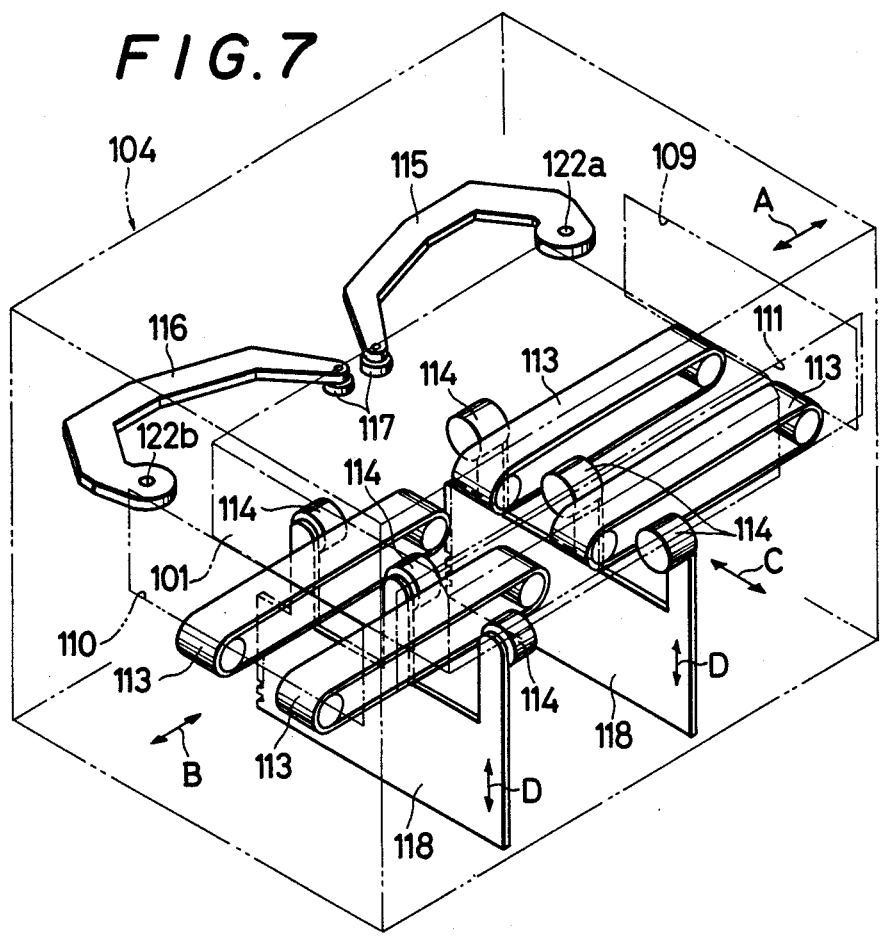
FIG. 7 is a schematic perspective view showing an alternate embodiment of the cassette transporting device of the present invention.

A second embodiment of the cassette carriage according to the present invention (will now be described with reference to FIGS. 7–12B). As shown in FIG. 7, a cassette carriage 104 includes four cassette conveyor belts 113 for tranferring a cassette 101 in directions A and B between cassette carriage 104 and cassette bins 102 through first and second openings 109 and 110 of the carriage; six rollers 114 for transferring cassette 101 between carriage 104 and VCRs 107 through a third opening 111 of carriage 104; and first and second pushing arms 115 and 116 for selectively pushing cassette 101 into the cassette bins 102 or the VCRs 107, either in the directions A and B through first and second openings 109 and 110, or in the direction C through third opening 111. Pushing arms 115 and 116 are arranged symmetrically and each has a roller 117 located at one end thereof. The six rollers 114, which are connected to platforms 118, are movable vertically in direction D.

The details of a drive mechanism 120 for pushing arms 115 and 116 will be hereinafter explained with reference to FIG. 8–10. Pushing arms 115 and 116 are rotatably mounted on axes 122a and 122b, respectively. An epicyclic train 123 is located between axes 122a and 122b on a chassis 121. Epicyclic train 123 comprises a driving axis 124 rotatably mounted on chassis 121, a first sun gear 125 affixed to driving axis 124, several (in this example, three) planet gears 126 connected to first sun gear 125 and rotatably mounted on a supporting axis 129, a second sun gear 128 having an inside gear 127 connected to planet gears 126 and rotatably mounted about driving axis 124, and a third sun gear 130 rotatably mounted about driving axis 124.

Figure 8:
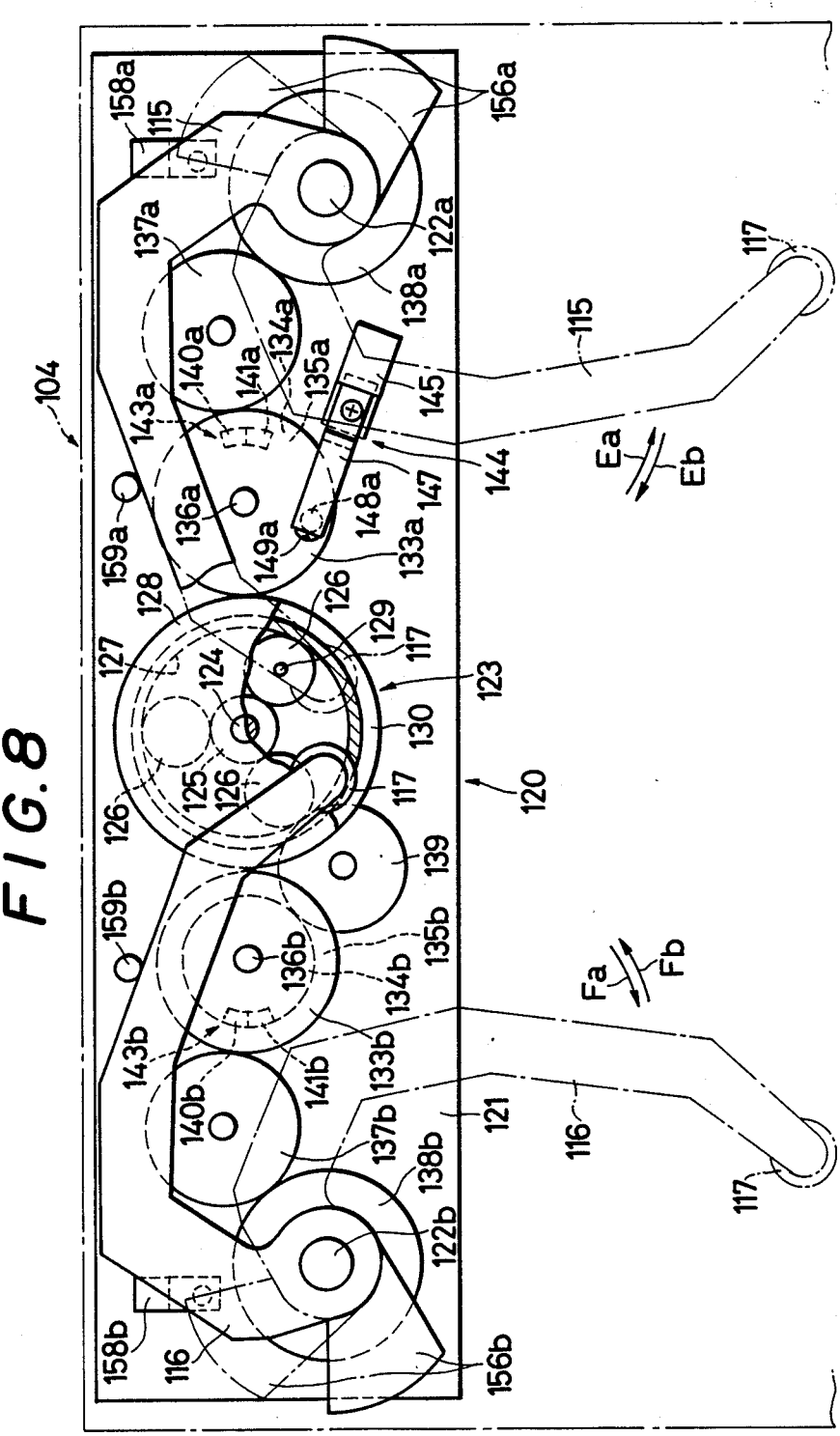
FIG. 8 is a schematic illustration explaining the operation of the embodiment shown in FIG. 7.
Figure 9:
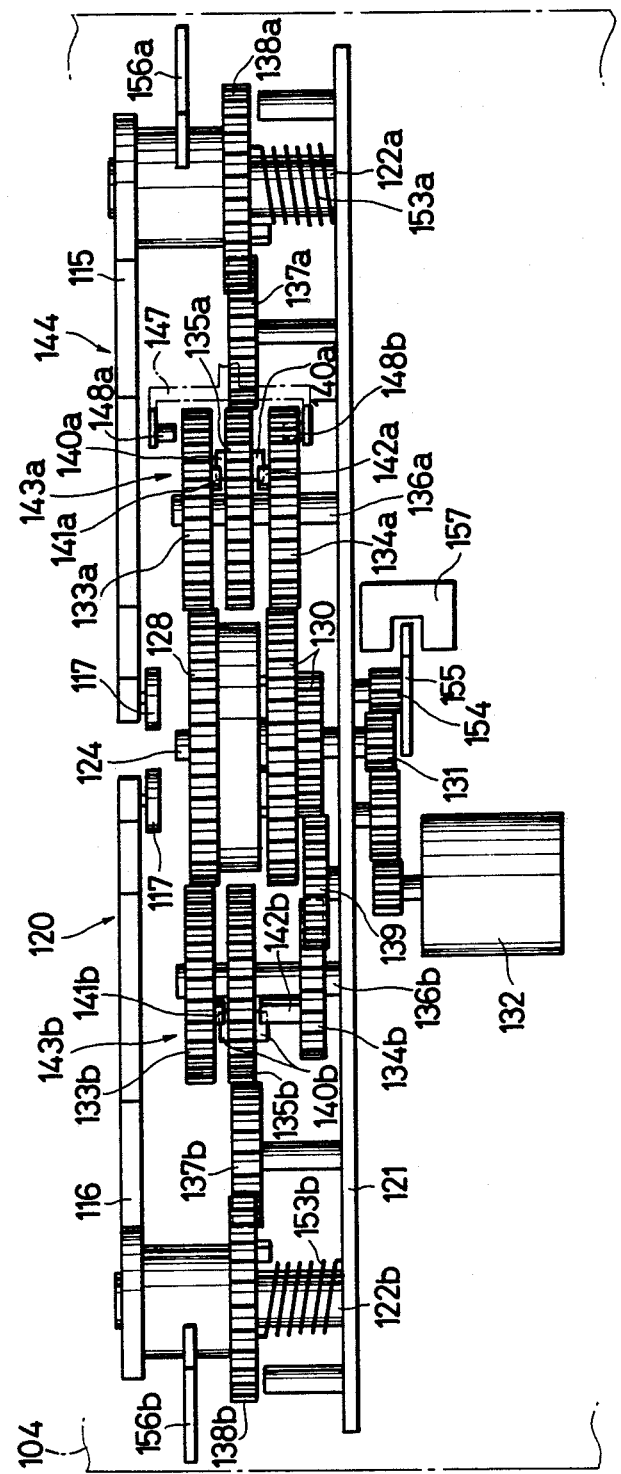
FIG. 9 is a side plan view of the embodiment shown in FIG. 8.

As seen in FIGS. 8 and 9, a pair of gears 133a and 134a, which are connected to the second and third sun gears 128 and 130, respectively, and a gear 135a located between gears 133a and 134a, are all rotatably mounted at a common axis 136a which, in turn, is mounted on chassis 121. The rotational movement of gear 135a is transferred through a gear 137a to a gear 138a, to which first pushing arm 115 is connected. A gear 133b, which is connected to second sun gear 128, and another pair of gears 134b and 135b are all rotatably mounted on a common axis 136b which, in turn, is mounted on chassis 121. The rotational movement of gear 135b is transferred through a gear 137b to a gear 138b, to which second pushing arm 116 is connected. The rotational movement of gear 134b is transferred to third sun gear 130 (which has a double gear), through an intermediate gear 139.

As shown in FIG. 9, clicks 140a and 140b, which are integral with both upper and lower portions of gears 135a and 135b, respectively, provide click clutches 143a and 143b in combination with clicks 141a, 142a, 141b and 142b, which clicks are integral with gears 133a, 134a, 133b and 134b, respectively.

Figure 10:
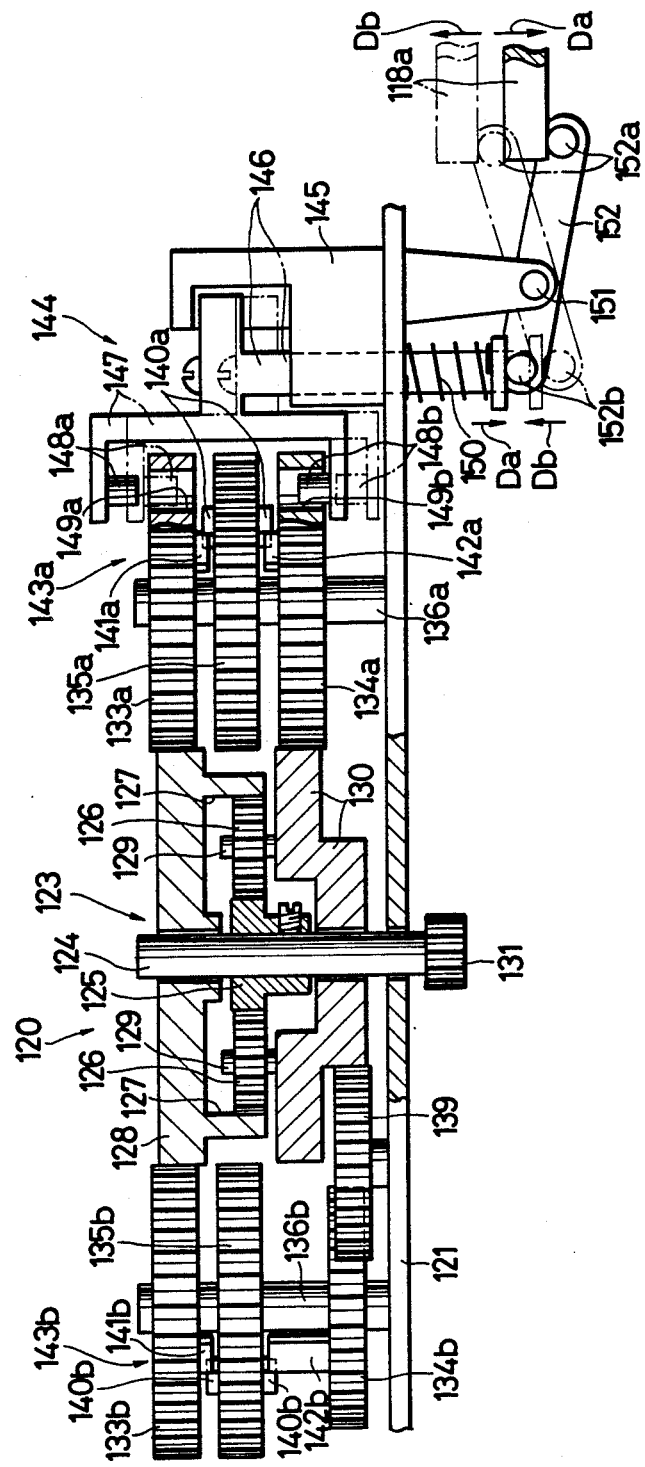
FIG. 10 is an enlarged side view of the embodiment shown in FIG. 9.

As shown in FIG. 10, a switch mechanism 144 selectively locks one of the second or third sun gears 128 or 130 of epicyclic train 123 in order to switch between the paths through which the power of motor 132 (ref. FIG. 9) is transferred. In switch mechanism 144, a vertically movable axis 146 is slidably mounted on a holder 145 which, in turn, is mounted on chassis 121. A pair of pins 148a and 148b protrude inwardly from a U-shaped arm 147 which is mounted on an upper end of vertically movable axis 146. Pins 148a and 148b are selectively inserted into one of the corresponding holes 149a and 149b located in the respective gears 133a and 134a. Vertically movable axis 146 is always biased downward by a spring 150 coiled around the lower end of vertically movable axis 146. A lever 152 is rotatably mounted at a supporting axis 151 which, in turn, is mounted on chassis 121. An upper portion of one end 152a of lever 152 contacts an arm 118a which is integral with the platforms 118, while an upper portion of the other end 152b of lever 152 contacts the lower end of vertically movable axis 146.

As shown in FIG. 9, springs 153a and 153b are coiled around axes 122a and 122b. Sensor plates 155, 156a and 156b, rotate with a gear 154 (which is driven by driving axis 124) and with gears 138a and 138b, respectively, to cooperate with sensors (such as photo couplers) 157, 158a and 158b (ref. FIGS. 8 and 9). Stoppers 159a and 159b (FIG. 8) are provided on chassis 121 to limit the movement of pushing arms 115 and 116.

Figure 12A:
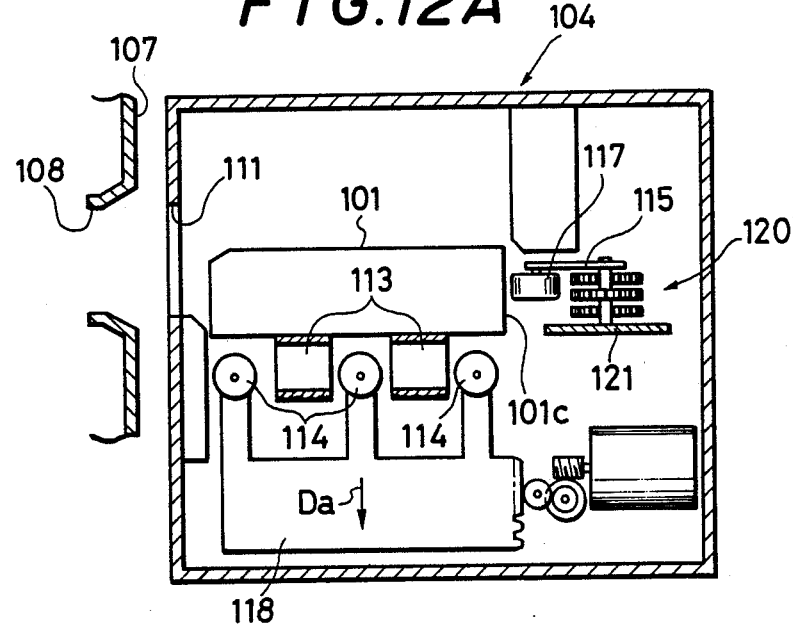
FIGS. 12A and 12B are side views of the cassette transporting device illustrating the operation of the embodiment shown in FIG. 9.

The following is a discussion of the operation of the above-described driving mechanism 120. As shown in FIG. 12A, the platform 118 is positioned downward in the direction Da when cassette 101 is placed horizontally onto cassette conveyor belts 113. Coincidentally, as shown by the solid lines defining lever 152, axis 146, and pin 148 in FIG. 10, one end 152a of lever 152 is positioned downward in the direction Da by the arm 118a of platform 118, whereas vertically movable axis 146 is positioned upward in the direction Db by the other end 152b of lever 152 pushing against spring 150, and a pin 148b of the lower end of U-shaped arm 147 is inserted into the hole 149b in gear 134a. As a result, gear 134a locks sun gear 130.

Figure 11A:
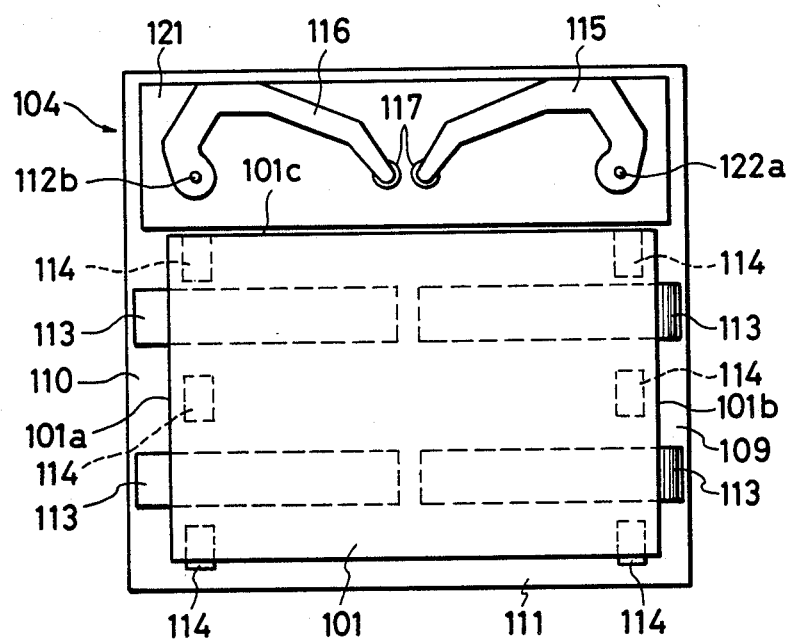
Figure 11B:
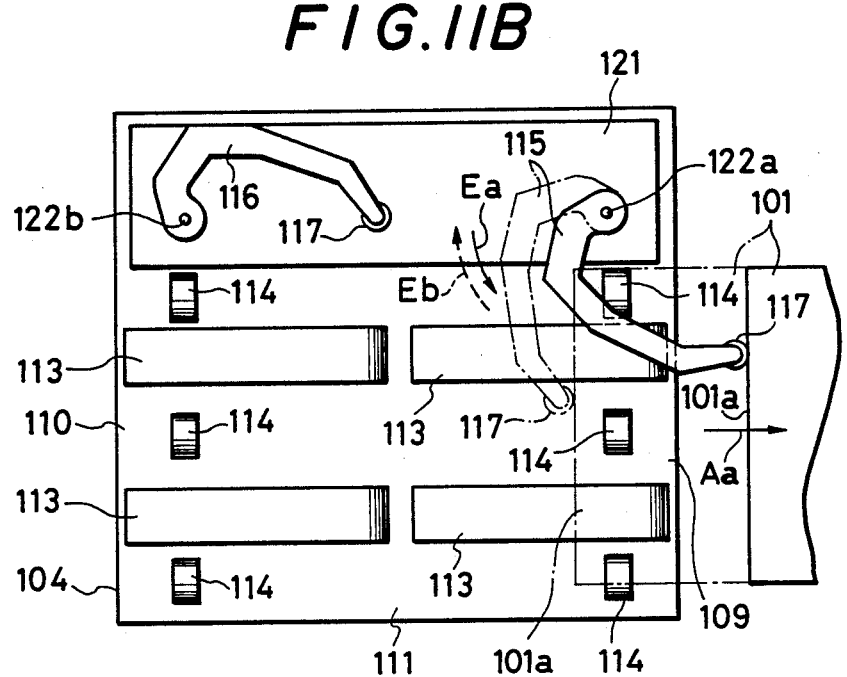

As shown by the phantom lines in FIGS. 11B and 11C, to transfer cassette 101 from within cassette carriage 104 into cassette bins 102, cassette conveyor belts 113 move cassette 101 selectively in the direction Aa or Ba through first or second opening 109 or 110, respectively. Substantially coincidentally, the appropriate one of first pushing arm 115 or second pushing arm 116 starts to rotate selectively in the direction Ea or Fa so that cassette 101 is pushed by roller 117 located at the end of first or second pushing arm 115 or 116, through the appropriate one of first or second opening 109 or 110 of carriage 104 into cassette bin 102.

Due to the fact that sun gear 130 is still locked, when driving axis 124 is driven forward or backward by motor 132 via gear 131, no movement of the three planet gears 126 (which are driven by sun gear 125) occurs in subsequently driving sun gear 128 through inner gear 127. Accordingly, when motor 132 rotates forward, this rotational movement is transferred to first pushing arm 115 via a first power transferring path consisting, in order, of elements 124 - 125 - 126 - 128 - 133a - 141a - 140a - 135a - 137a - 138a. Thus, first pushing arm 115 rotates in the direction Ea in opposition to the force of spring 153a. When motor 132 rotates backward, this rotational movement is transferred to second pushing arm 116 via a second power transferring path consisting, in order, of elements 124 - 125 - 126 - 128 -

133b - 141b - 140b - 135b - 137b - 138b, so that the second pushing arm 116 rotates in the direction Eb in opposition to the force of spring 153b. Click clutches 143a and 143b are utilized so that only one of the first or second pushing arms 115 or 116 is rotated at a time. More specifically, during rotation of first pushing arm 115, click clutch 143b is off, which prohibits rotation of second pushing arm 116. Conversely, during rotation of second pushing arm 116, click clutch 143a is off, thereby prohibiting rotation of first pushing arm 115. When the interaction of sensor 157 with sensor plate 155 causes sensor 157 to detect that first or second pushing arm 115 or 116 has reached its maximum rotatable angle (as shown by the sold lines in FIGS. 11B and 11C) motor 132 starts to rotate in an opposite direction, i.e., from forward to backward or vice versa. This opposite rotation, together with pressure from one of springs 153a or 153b, causes first or second pushing arm 115 or 116 to return to its original position in a direction Eb or Fb, respectively, until first or second pushing arm 115 or 116 reaches stopper 159a or 159b.

Figure 12B:
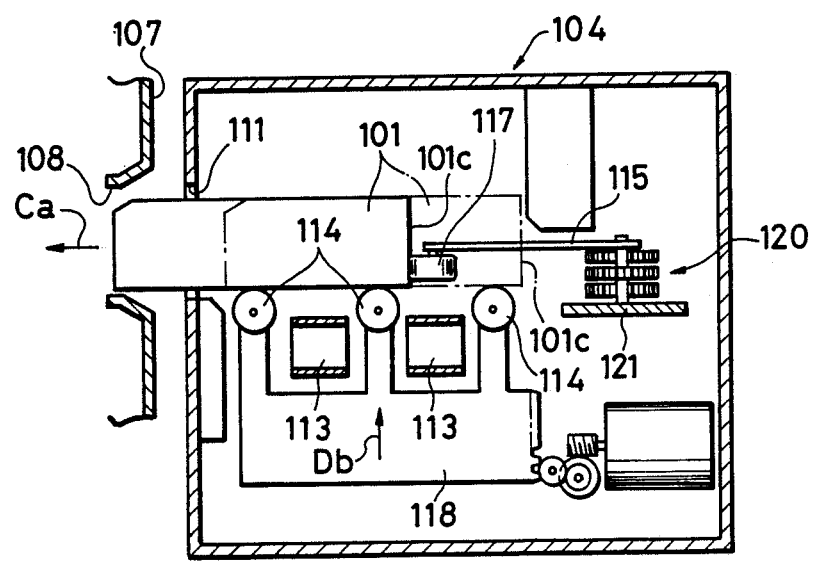

As shown in FIGS. 11D and 12B, cassette 101 may also be transferred from within cassette carriage 104 through third opening 111, in a direction Ca, into cassette inserting portion 108 of VCR 107. To accomplish this motion, platforms 118 move upward in the direction Db, and, accordingly, the six rollers 114 push cassette 101 upward from cassette conveyor belts 113 (ref. to phantom lines in FIG. 11D). As arm 118a of platform 118 moves upward in the direction Db (as shown by the phantom lines in FIG. 10), vertically movable axis 146 moves downward in the direction Da due, in part, to the force of spring 150. Coincidentally, pin 148a of the upper end of U-shaped arm 147 is inserted into hole 149a of gear 133a, thereby locking gear 133a and, hence, sun gear 129.

In this instance, when the driving axis 124 is driven forward by motor 132 via gear 131, the three planet gears 126 (which are driven by the sun gear 125), move, and subsequently drive sun gear 130. This is due to the fact that sun gear 128 is locked. Accordingly, when motor 132 rotates in a forward direction, this rotational movement is transferred to both the first and second pushing arms 115 and 116 via both a third power transferring path consisting, in order, of elements 124 - 125 - 126 - 130 - 134a - 142a -140a - 135a - 137a - 138a, and a fourth power transferring path consisting, in order, of elements 124 - 125 - 126 - 130 - 139 - 134b - 142b - 140b - 135b - 137b -138b. Consequently, first and second pushing arms 115 and 116 rotate in the directions Ea and Fa, respectively, against the forces of springs 153a and 153b (as shown in FIG. 11D).

As a result of this rotation of both first and second pushing arms 115 and 116, rollers 117 simultaneously push side 101C of cassette 101 so that cassette 101 is inserted through third opening 111 in a direction Ca into the cassette inserting portion 108. When the interaction of sensor 157 and sensor plate 155 causes sensor 157 to detect that first and second pushing arms 115 and 116 have reached their respective maximum rotatable angles (as shown in FIG. 11D), motor 132 begins to rotate in a backward direction. First and second pushing arms 115 and 116 thus return to their original positions by moving against springs 153a and 153b in the directions Eb and Fb, respectively, until each arm reaches the appropriate stopper 159a or 159b. In the above case, to ensure the accurate and expedient transferring of cassette 101, additional pushing rollers (such as the cassette pushing rollers 18 of the first embodiment) may be provided. Such rollers would be used to push cassette 101 toward the cassette conveyor belts 113 or the rollers 114.

FIGS. 13 through 16 illustrate a third embodiment of a cassette carriage 204 according to the present invention. In particular, this third embodiment is an improved version of the first embodiment. Accordingly, since the main features and elements of the cassette carriage of this embodiment function in a substantially similar manner to those of the first embodiment, an additional detailed description of these main features and elements is omitted here for the sake of brevity.

Figure 13:
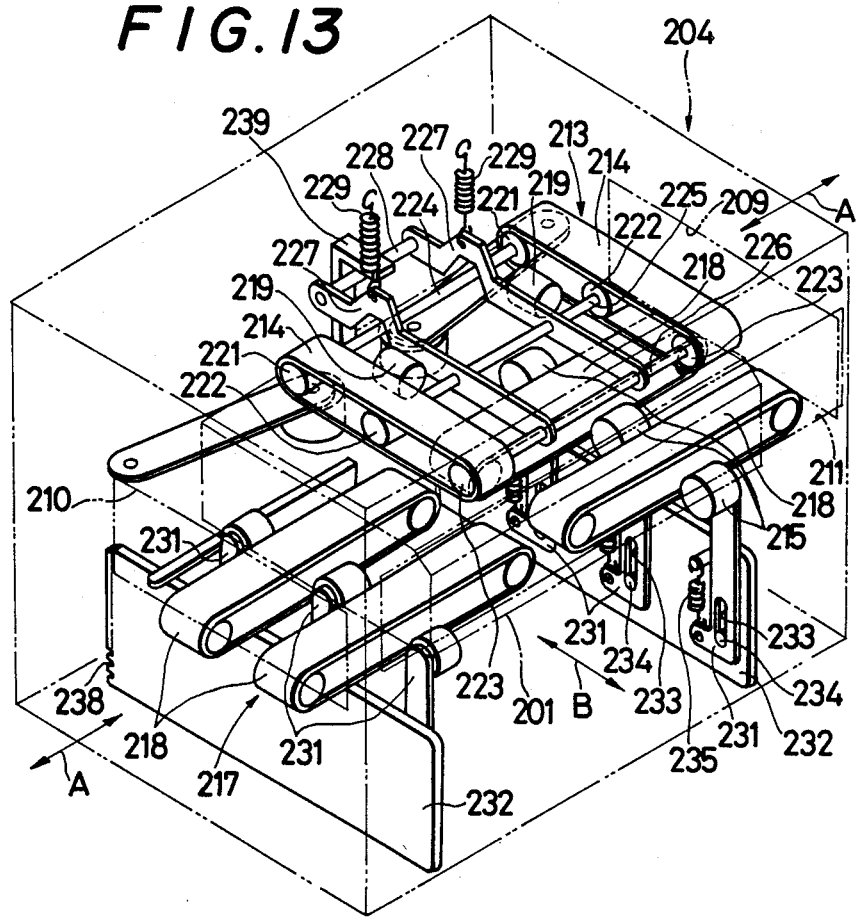
FIG. 13 is a schematic perspective view of additional details of the cassette transporting device of the present invention.
Figure 14A:
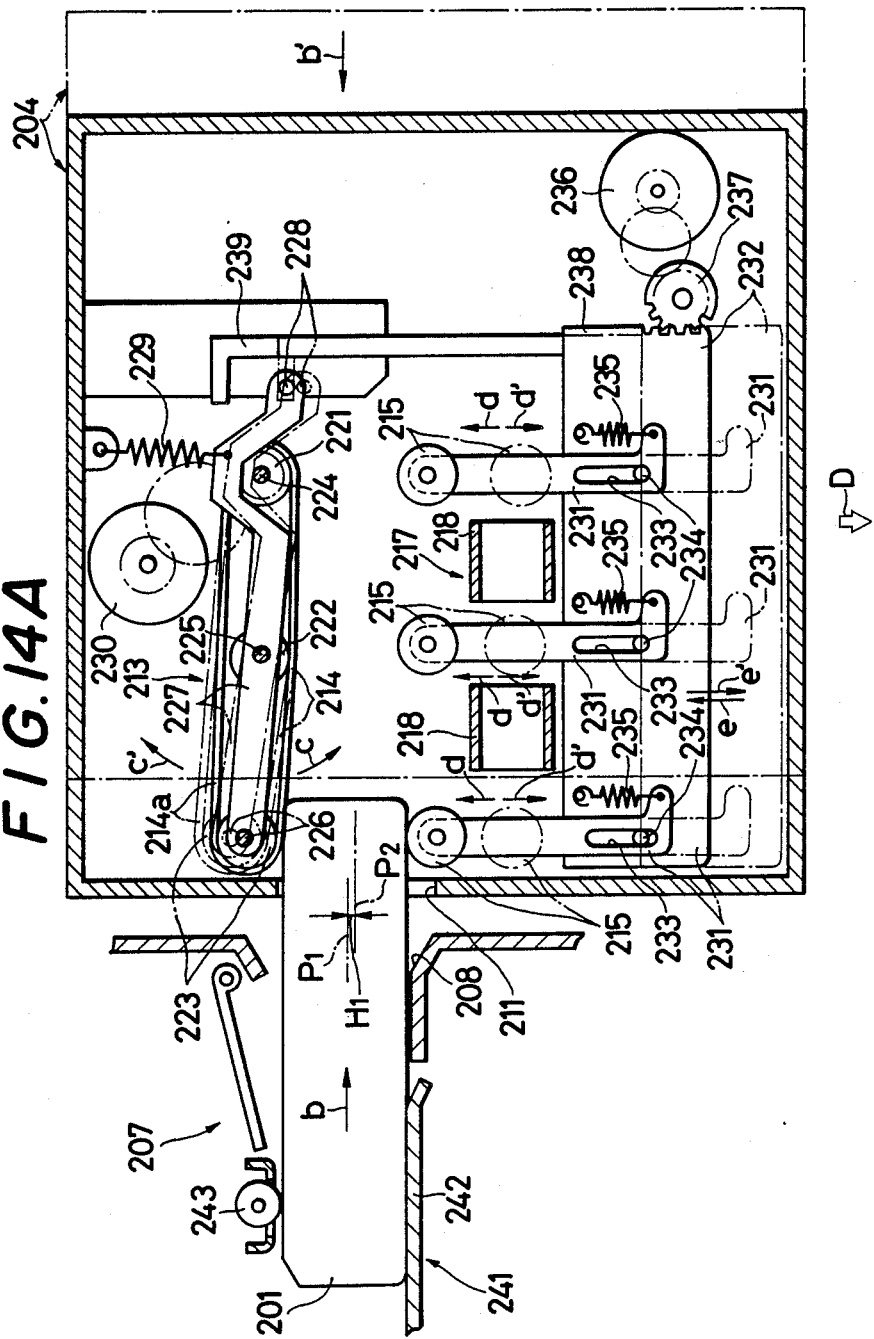
Figure 14B:
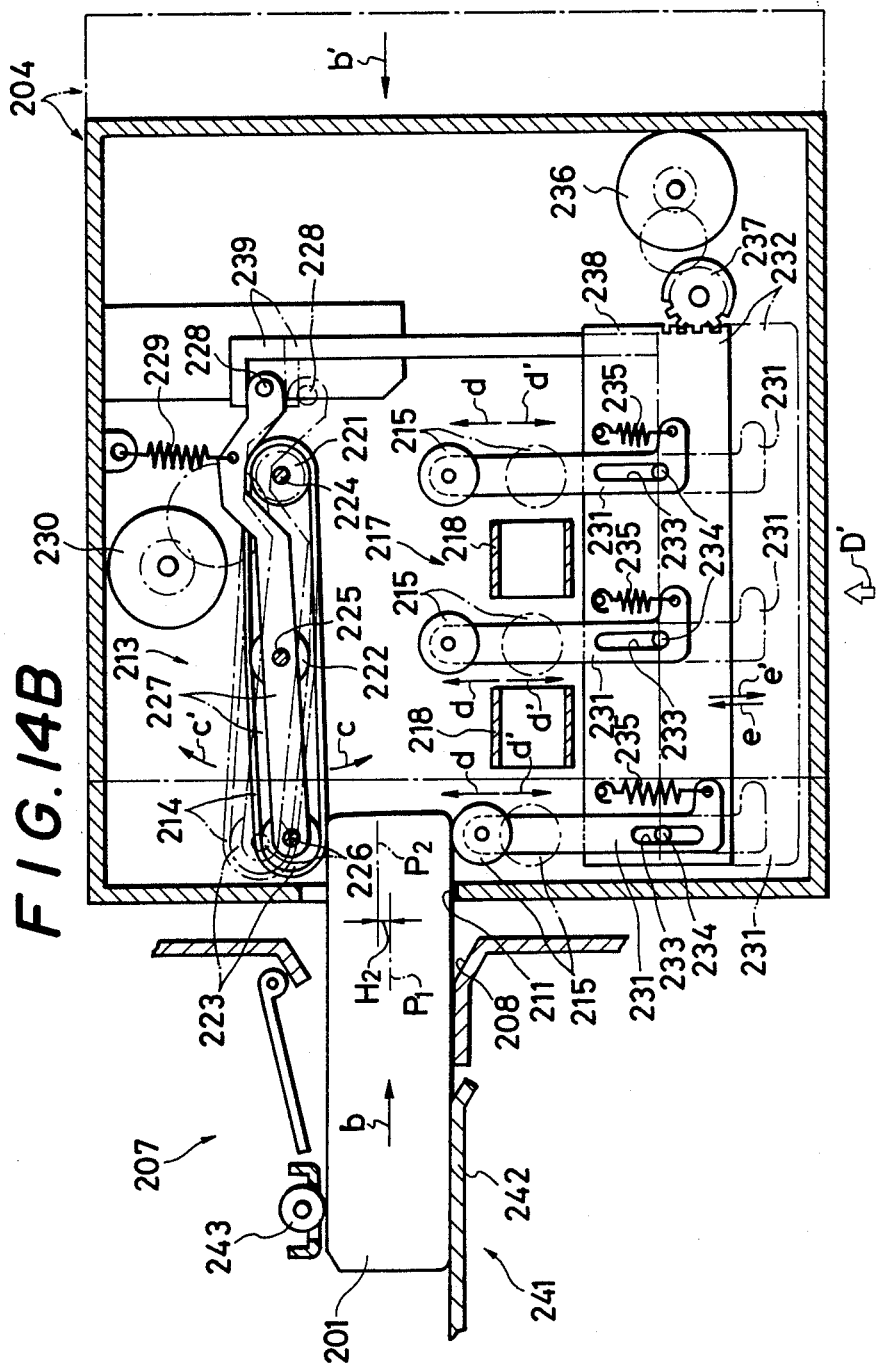

As seen in FIGS. 13 and 14A, two cassette conveyor belts 214 and six pushing rollers 215 are spaced apart and arranged respectively above and below a third opening 211 of the cassette carriage 204. Conveyor belts 214 are wrapped in a parallel fashion around driving rollers 221, intermediate rollers 222 and idle rollers 222, which rollers are connected to a driving axis 224, an intermediate axis 225 and an idle axis 226, respectively. Two belt arms 227 are also connected to intermediate axis 225 at a supporting point, such that belt arms 227 pivot in directions c and c' about intermediate axis 225. One end of each of the belt arms 227 is connected to idle axis 226 while the other end is connected to a belt arm pin 228 which extends between the belt arms 227. The two belt arms 227 are biased by springs 229 in direction c about the intermediate axis 225. One of the ends 214a of conveyor belts 214 is also thereby biased in direction c. A motor 230 drives the conveyor belts 214 via driving axis 224.

Pushing rollers 215 are rotatably mounted on the upper ends of six roller arms 231. Roller arms 231 are slidably mounted on slide blocks 232 with sliding motion limited by guide pins 234 within long holes 233 of the roller arms 231. In addition to roller arms 231 being slidable in the directions d and d', the arms are biased by springs 234 so that they exert a force to push the pushing rollers 215 against the cassette 201. The pushing force exerted on the conveyor belt ends 214a in direction c is selected to be substantially equal to that of the pushing force exerted on rollers 215 in the direction d. A combination of a rack 238 and a pinion 237, driven by a motor 236, provides for the sliding motion in directions e and e' of slide blocks 232. A slide arm 239 which extends upward from slide blocks 232 interacts with the belt arm pin 228.

The following describes the operations involved in transferring cassette 201 from a VCR 207 to the cassette carriage 204. As shown by phantom lines in FIGS. 14A and 14B, slide blocks 232 are initially positioned downward in the direction e' so that all of the pushing rollers 215 are also positioned downward. At the same time, the belt arm pin 228 is pulled downward by slide arm 239, and belt arm 227 is pivoted in direction c' against the force of spring 229. Thus, the ends 214a of conveyor belts 214 are also positioned upward in the direction c'.

After cassette 201 has been horizontally ejected from VCR 207 through the cassette inserting portion 208, cassette 201 is held between a cassette holding base 242 and a cassette holding roller 243. Next, cassette carriage 204 moves in the direction b' from a first position (indicated by the phantom lines of FIG. 14A) to a second position (indicated by the solid lines of FIG. 14A) until the ends 214a of conveyor belts 214 and those pushing rollers 215 which are located closest to the VCR 207 engage the cassette 201. The operation of rack 238 and pinion 237, driven by motor 236, causes slide blocks 232 and, accordingly, pushing rollers 215 to move upward in the direction c. At the same time, slide arm 239, which was pushing down on the belt arm pin 228, is released so that, by the action of spring 229, belt arm 227 swings in the direction c, and the ends 214a of the conveyor belts 214 also move downward in the same direction c. As a result, and by utilizing the biasing forces of springs 229 and 235, the ends 214a of conveyor belts 214 and those pushing rollers 215 which are located closest to the VCR 207 grip the cassette 201 which has been partially inserted into third opening 211.

Figure 15:
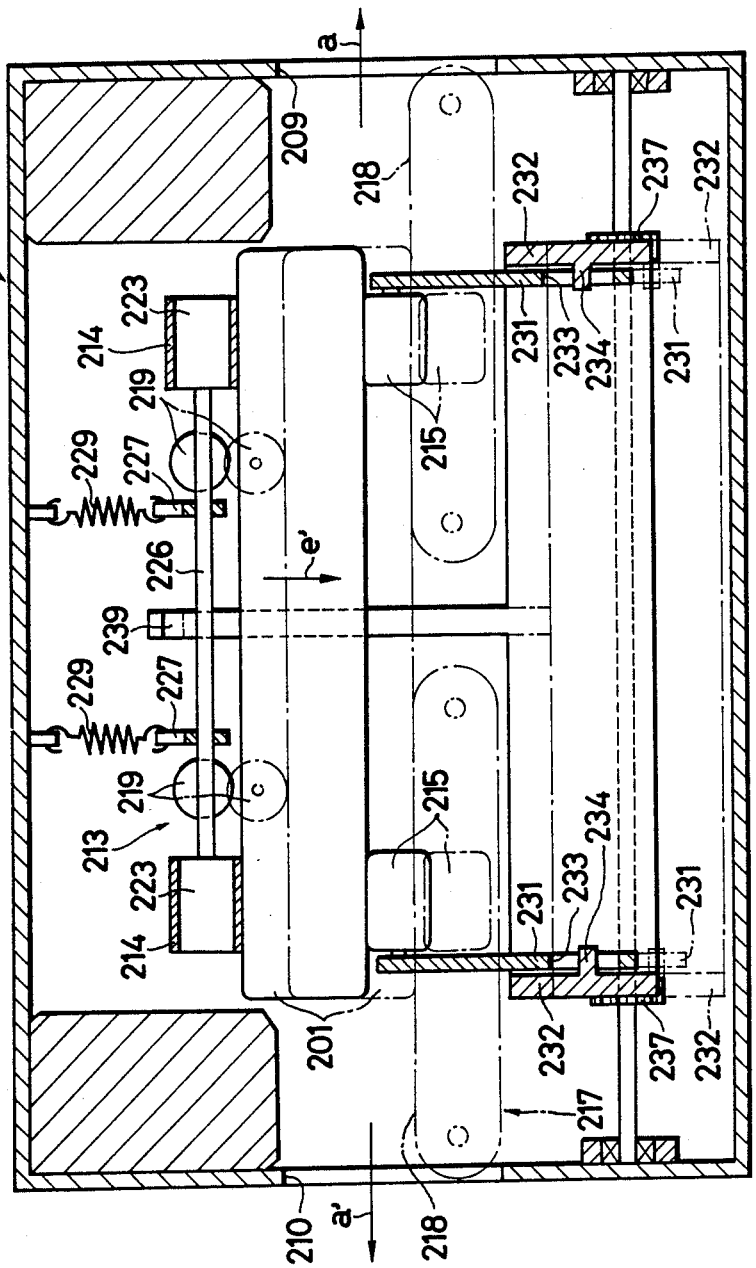
FIG. 15 is a front view illustrating the operation of the embodiment shown in FIG. 13.

Cassette 201, which is firmly held between pushing rollers 215 and the conveyor belts 214, is then transferred in the direction b by conveyor belts 214, from the VCR 207 to the inside of the cassette carriage 204 until cassette 201 reaches a predetermined position (as shown by the solid lines outlining cassette 201 in FIGS. 14C and 15). Due to uncertainties respecting the relative positioning of VCR 207 and cassette carriage 204, some deviation of the vertical position of cassette 201 with respect to cassette carriage 204 may occur. This deviation may be corrected, and the relative positions of cassette 201 and cassette carriage 204 adjusted, during the operation where cassette 201 is being transferred by conveyor belts 214. This correction is possible because the biasing forces produced by springs 229 and 235 in directions c and d, respectively, are balanced.

For example, as shown in FIG. 14A, if cassette carriage 204 deviates upward or downward in position with respect to VCR 207, there is a corresponding deviation distance H1 between the position P1 of cassette 201 and the position P2 of third opening 211. This deviation distance H1 is automatically adjusted by the above-described particular construction and operations of conveyor belts 214, pushing rollers 215, etc. As a result, the insertion of cassette 201 in direction b into cassette carriage 204 is very smooth, and the position of cassette 201 inside the cassette carriage 204 is fixed by intermediate rollers 222.

It is also possible that when cassette 201 is inserted into cassette carriage 204, the slide blocks 232 are initially positioned upward so that pushing rollers 215 are positioned upward, and the ends 214a of conveyor belts 214 are positioned downward in direction c by spring 229. In this case, the insertion of cassette 201 into cassette carriage 204 is also smooth because of the flexibility of both the conveyor belts 214 and the pushing rollers 215 in accommodating cassette 201 between them. Even if, e.g., there is a substantial deviation downward (in the direction D) of cassette carriage 204 with respect to cassette 201, causing cassette 201 to hit conveyor belts 214, the ends 214a of conveyor belts 214 adjust smoothly upward as per the biasing of spring 229. Accordingly, this construction avoids the problem of accidentally pushing the cassette 201 back toward the VCR 207.

Figure 14D:
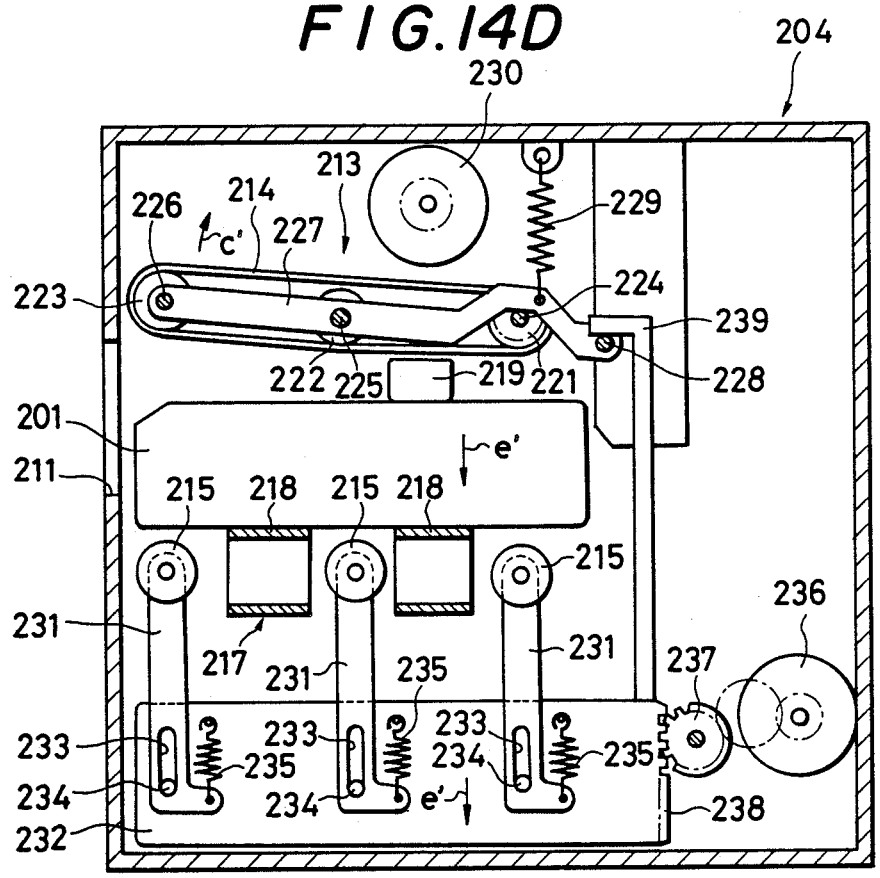

After cassette 201 has entered the inside of cassette carriage 204, as shown in FIG. 14D, the slide blocks 232 move downward in the direction e' so that cassette 201 is positioned horizontally on conveyor belts 218 and no longer contacts conveyor belts 214. Pushing rollers 219, which move downward along with the slide blocks 232, are then used instead of conveyor belts 214 to push cassette 201 against conveyor belts 218. As shown by the phantom lines in FIG. 15, cassette 201 is selectively transferred by the conveyor belts 218 to the cassette bins 202 in the directions a or a' through first or second openings 209 or 210 of cassette carriage 204. It is noted that the operation of transferring cassette 201 from cassette bins 202 to cassette carriage 204, and the operation of transferring cassette 201 from cassette carriage 204 to VCR 207 are merely the reverse operations of those described above. Therefore, additional detailed explanations are unnecessary and, hence, omitted.

The automatic adjustment mechanism of the present invention should not be limited to the above-described embodiment, but can be utilized in numerous applications in keeping with the scope and spirit of the present invention. For example, although the automatic adjustment mechanism is described above as utilized in a cassette carriage 204 which transfers a cassette 201 between the cassette carriage 204 and a VCR 207, the mechanism is equally applicable to a cassette carriage 204 which transfers a cassette 201 between the cassette carriage 204 and cassette bins 202.

In addition, besides the cassette conveyor belts 214 and the cassette pushing rollers 215, numerous variations of cassette conveyor means and cassette pushing means are also within the scope and spirit of the present invention. For example, as illustrated in FIG. 16, the cassette conveyor means comprises a plurality of driving rollers 245, 246 and 247 which are driven via gear trains 248 by a motor (not shown). The driving rollers 245 can swing in the directions c and c' because a roller axis 246a acts as a supporting point, allowing roller arm 249 to pivot about roller axis 246a. In this alternative embodiment, springs (not shown) may be used to bias the end of roller arm 249, which contains the driving roller 245, in the direction c'.

It should also be clear that the embodiments of the present invention described above would be applicable not only to automatic cassette changing systems utilizing video cassettes, but also to general automatic changers which may utilize other types of cassettes or cartridges for magnetic tape, optical discs, etc. Thus, although the present invention has been described with reference to preferred embodiments, it should be understood by those in the art that various changes or substituted equivalents are within the scope of the invention, and that the invention includes all embodiments covered within the scope of the claims.

What is claimed is:

1. An automatic changer for cassettes each containing a recording medium, said changer comprising:
    a first block of cassette bins for storing said cassettes therein;
    a second block of cassette bins for storing said cassettes therein, said second block being positioned relative to said first block so as to provide a channel therebetween;
    a plurality of apparatuses each adapted to record and/or reproduce signals on and/or from the recording medium of a selected one of said cassettes, said apparatuses being positioned proximal to said first and second blocks of cassette bins and each having a cassette inserting which faces said channel; and
    a cassette carriage movable in said channel, said cassette carriage comprising:
    first transferring means for transferring a selected one of said cassettes between said cassette carriage and said cassette bins of said first block through a first opening of said cassette carriage in a first direction;
    second transferring means for transferring a selected one of said cassettes between said cassette carriage and said cassette bins of said second block through a second opening of said cassette carriage in a second direction which is parallel to said first direction;

third transferring means for transferring a selected one of said cassettes between said cassette carriage and said apparatuses through a third opening of said cassette carriage in a third direction which is perpendicular to said first and second directions.

2. An automatic changer for cassettes each containing a recording medium, said changer comprising:

a first block of cassette bins for storing said cassettes therein;

a second block of cassette bins for storing said cassettes therein, said second block being positioned relative to said first block so as to provide a channel therebetween;

a plurality of apparatuses each adapted to record and/or reproduce signals on and/or from the recording medium of a selected one of said cassettes, said apparatuses being positioned proximal to said first and second blocks of cassette bins and each having a cassette inserting portion which faces said channel; and a cassette carriage movable in said channel, said cassette carriage comprising:

first driving means for driving a first pushing arm so as to push a selected one of said cassettes from said cassette carriage toward said first block of cassette bins in a first direction through a first opening of said cassette carriage;

second driving means for driving a second pushing arm so as to push a selected one of said cassettes from said cassette carriage toward said second block of cassette bins through a second opening of said cassette carriage in a second direction which is parallel to said first direction; and third driving means for simultaneously driving said first and second pushing arms so as to push said a selected one of cassettes from said cassette carriage toward said apparatuses through a third opening of said cassette carriage in a third direction which is perpendicular to said first and second directions.

3. An automatic changer for cassettes each containing a recording medium; said changer comprising:

a first block of cassette bins for storing said cassettes therein;

a second block of cassette bins for storing said cassettes therein, said second block being positioned relative to said first block so as to provide a channel therebetween;

a plurality of apparatuses each adapted to record and/or reproduce signals on and/or from the recording medium of a selected one of said cassettes, said apparatuses being positioned proximal to said first and second blocks of cassette bins, and each having a cassette inserting portion which faces said channel; and a cassette carriage movable in said channel, said cassette carriage comprising:

first transferring means for transferring a selected one of said cassettes through first and second openings of said cassette carriage in first and second parallel directions between said cassette carriage and the cassette bins of said first and second blocks; and second transferring means for transferring a selected one of said cassettes through a third opening of said cassette carriage in a third direction between said cassette carriage and said apparatuses, said third direction being perpendicular to said first and second directions.

4. An automatic changer for cassettes as in claim 3, wherein said first transferring means comprises:

a first conveyor belt for selectively conveying a selected one of said cassettes in said first or second direction, and first pushing means for pushing a selected one of said cassettes against said first conveyor belt; and wherein said second transferring means comprises:

a second conveyor belt for conveying a selected one of said cassettes in said third direction, and second pushing means for pushing a selected one of said cassettes against said conveyor belt, said first and second conveyor belts being positioned perpendicular to each other.

5. An automatic changer for cassettes as in claim 4, further comprising:

selected means for selecting a first or second mode, such that in said first mode, a selected one of said cassettes is pushed against said first conveyor belt by said first pushing means, whereby said selected one of the cassettes is conveyed in said first or second direction; and in said second mode, a selected one of said cassettes is pushed against said second conveyor belt by said second pushing means, whereby the selected one of said cassettes is conveyed in said third direction.

6. An automatic changer for cassettes as in claim 4, wherein said first and second pushing means complementarily push the respective selected ones of said cassettes against said first and second conveyor belts in opposite directions.

* * * * *